(12) United States Patent
Fellner et al.

(10) Patent No.: US 7,221,751 B2
(45) Date of Patent: *May 22, 2007

(54) METHOD AND SYSTEM FOR CALL TRACING

(75) Inventors: Paul W. Fellner, Crystal Lake, IL (US); James F. Langdon, Oconomowoc, WI (US)

(73) Assignee: Ameritech Services, Inc., Hoffman Estates, IL (US)

( * ) Notice: Subject to any disclaimer, the term of this patent is extended or adjusted under 35 U.S.C. 154(b) by 61 days.

This patent is subject to a terminal disclaimer.

(21) Appl. No.: 11/144,477

(22) Filed: Jun. 2, 2005

(65) Prior Publication Data

US 2005/0226402 A1   Oct. 13, 2005

Related U.S. Application Data

(63) Continuation of application No. 10/685,356, filed on Oct. 14, 2003, now Pat. No. 6,925,164, and a continuation of application No. 10/167,282, filed on Jun. 11, 2002, now Pat. No. 6,718,031, which is a continuation of application No. 09/873,613, filed on Jun. 4, 2001, now Pat. No. 6,404,882, which is a continuation of application No. 09/429,576, filed on Oct. 28, 1999, now Pat. No. 6,243,458, which is a continuation of application No. 09/061,926, filed on Apr. 17, 1998, now Pat. No. 5,999,616.

(51) Int. Cl.
| | |
|---|---|
| H04M 1/57 | (2006.01) |
| H04M 3/22 | (2006.01) |
| H04M 7/00 | (2006.01) |
| H04Q 3/72 | (2006.01) |

(52) U.S. Cl. .............. 379/247; 379/32.05; 379/142.17; 379/219; 379/249; 379/900

(58) Field of Classification Search ...... 340/FOR. 312; 345/2.1; 379/32.01–32.05, 127.01, 142.17, 379/219, 242, 245, 246, 247, 249, 900, FOR. 102
See application file for complete search history.

(56) References Cited

U.S. PATENT DOCUMENTS

| | | |
|---|---|---|
| 3,795,774 A | 3/1974 | Talbot |
| 3,904,830 A | 9/1975 | Every, Sr. et al. |
| 3,997,732 A | 12/1976 | Every, Sr. et al. |
| 4,464,543 A | 8/1984 | Kline et al. |
| 4,591,665 A | 5/1986 | Foster et al. |
| 4,754,475 A | 6/1988 | Pintos et al. |
| 4,914,689 A | 4/1990 | Quade et al. |
| 5,546,448 A | 8/1996 | Caswell et al. |
| 5,644,626 A | 7/1997 | Carlsen et al. |
| 5,659,604 A | 8/1997 | Beckmann |
| 5,668,852 A | 9/1997 | Holmes |

(Continued)

*Primary Examiner*—Harry S. Hong
(74) *Attorney, Agent, or Firm*—Brinks Hofer Gilson & Lione

(57) ABSTRACT

The present invention is drawn to a call trace system and method that is simple to establish in a short amount of time. The call trace is implemented through a Web browser page which remotely programs central offices to trace calls to particular number. When a trace is established a message is sent back to the Web browser which displays the calling number, the called number and the central office detecting the call. Also, a page is sent to a pager which displays the traced information.

9 Claims, 9 Drawing Sheets

U.S. PATENT DOCUMENTS

| | | |
|---|---|---|
| 5,692,038 A | 11/1997 | Kraus et al. |
| 5,694,453 A | 12/1997 | Fuller et al. |
| 5,844,522 A | 12/1998 | Sheffer et al. |
| 5,930,344 A | 7/1999 | Relyea et al. |
| 5,999,616 A * | 12/1999 | Fellner et al. .............. 379/247 |
| 6,243,458 B1 * | 6/2001 | Fellner et al. .............. 379/247 |
| 6,286,050 B1 | 9/2001 | Pullen et al. |
| 6,404,882 B2 * | 6/2002 | Fellner et al. .............. 379/247 |
| 6,718,031 B2 * | 4/2004 | Fellner et al. .............. 379/247 |
| 6,925,164 B2 * | 8/2005 | Fellner et al. .............. 379/247 |

* cited by examiner

Ameritech Call Tracer
Enter The Telephone number [ ] — 42
Select The State:
○ Illinois  ○ Indiana  ○ Michigan  ○ Ohio  ○ Wisconsin
44
Enter Your Login: [ ] — 46
Enter Your Password: [ ] — 48
50 — [submit]  [resist] — 52
[000098] — 54
Call Trace File (Switch Format) — 56
*Fig. 5*

Calltrace Confirmation
___

Number to be Traced = 4146785873 — 60

State Trace will be placed = Illinois — 62

58 peorilpjdc1  Good Calltrace Entry 4146785873
pkfsilpfdc0  Good Calltrace Entry 4146785873
peorilpbdc0  Good Calltrace Entry 4146785873
refrilredc0  Good Calltrace Entry 4146785873
ofinilmqdc1  Good Calltrace Entry 4146785873
refrilrtdc1  Good Calltrace Entry 4146785873
refrilrtdc0  Good Calltrace Entry 4146785873
rvgvilrgdc0  Good Calltrace Entry 4146785873
scbgilcodc0  Good Calltrace Entry 4146785873
scbgilrsdc0  Good Calltrace Entry 4146785873
smmtilsmdc0  Good Calltrace Entry 4146785873 — 102
spfdilesdc1  Good Calltrace Entry 4146785873
spfdilesdc2  Good Calltrace Entry 4146785873
whtnilwhdc0  Good Calltrace Entry 4146785873                 100
wdstilwsdc0  Good Calltrace Entry 4146785873
spfdilesdc0  Good Calltrace Entry 4146785873
spfdilsldc0  Good Calltrace Entry 4146785873 — 102
rcisilridc1  Good Calltrace Entry 4146785873
spfdilswdc0  Good Calltrace Entry 4146785873
cenlilcedc0  Failed to Login into Switch: Failed to enter 4146785873
failed to receive login prompt
                                                             104
wtskilwtdc0  Good Calltrace Entry 4146785873
bntoilagdc0  Good Calltrace Entry 4146785873
bgbkilbkdc0  Good Calltrace Entry 4146785873
oklwiloldc0  Good Calltrace Entry 4146785873
lemtillndc0  Good Calltrace Entry 4146785873
arihilahdc0  Good Calltrace Entry 4146785873 — 102
chcgillrdc0  Good Calltrace Entry 4146785873
chcgilladc0  Good Calltrace Entry 4146785873
chcgilcadc1  Good Calltrace Entry 4146785873
hgpkilhpdc0  Failed to Login into Switch: Failed to enter 4146785873
failed to receive login prompt
chcgilpmdc0  Good Calltrace Entry 4146785873
chcgilwbdc2  Good Calltrace Entry 4146785873
hfesilwldc0  Good Calltrace Entry 4146785873
chcgilmode1  Good Calltrace Entry 4146785873           — 104
plfdilpldc0  Failed to enter 4146785873 into calltrac list
rsllilrzdc0  Failed to enter Entry 4146785873 into calltrac list
                                                             — 104

*Fig. 7*

METHOD AND SYSTEM FOR CALL TRACING

RELATED APPLICATIONS

This application is a continuation of application Ser. No. 10/685,356, filed Oct. 14, 2003 now U.S. Pat. No. 6,925,164, is a continuation of application Ser. No. 10/167,282, filed Jun. 11, 2002 and issued as U.S. Pat. No. 6,718,031 on Apr. 6, 2004, which is a continuation of application Ser. No. 09/873,613, filed on Jun. 4, 2001 and issued as U.S. Pat. No. 6,404,882 on Jun. 11, 2002, which is a continuation of application Ser. No. 09/429,576, filed on Oct. 28, 1999 and issued as U.S. Pat. No. 6,243,458 on Jun. 5, 2001, which is a continuation of application Ser. No. 09/061,926, filed on Apr. 17, 1998 and issued as U.S. Pat. No. 5,999,616 on Dec. 7, 1999, all of which applications are incorporated herein in their entirety by this reference.

REFERENCE TO COMPUTER PROGRAM LISTING APPENDIX ON CD ROM

A computer program listing appendix is submitted on a compact disc containing computer program code listings pursuant to 37 C.F.R. 1.52(e) and is hereby incorporated herein in its entirety by this reference. The total number of compact discs is 1 including 46,074 bytes. The compact disc includes one file created Oct. 14, 2003 entitled "8285-753 Source Code Appendix."

BACKGROUND

1. Field of the Invention

The present invention relates to a method and system for call tracing, and, more particularly, to an automated method and system for quickly and simply establishing and removing a trace on a telephone line.

2. Background Information

Known methods and systems for establishing a trace on an identified telephone number have, in general, been cumbersome and time-consuming thereby, often wasting valuable time in a situation where time is of the essence. More particularly, some known methods and systems for establishing a trace require manually programming central office switches in a geographic area. For example, if a trace is to be established for calls originating in the Chicago area, such a task typically requires three persons about three hours each to manually perform the task. This wastes precious time in a situation, such as a kidnapping, where time can not be wasted. In addition, as with any system that requires manual programming, errors may be made which would compromise the trace and lead to valuable information being lost.

Other known call tracing methods and systems require that an incoming call actually be answered and that the answering party initiate the trace. For example, U.S. Pat. No. 4,591,665 (Foster et al.) disclose a method of providing customer originated call tracing. If a customer receives an obscene or nuisance call, for example, the customer enters a code indicating that such a call has been received. The identity of the calling party is identified to authorities in response to the action by the customer. Such a system has obvious drawbacks including the potential for abuse by a called party. Such abuse would waste valuable time on the part of the authorities and detract authorities from where their resources are most needed. Other systems use a caller identification type of tracing commonly referred to as caller ID. U.S. Pat. No. 4,754,475 (Pintos et al.) discloses a calling line tracing system and identification detector which identifies of a calling party without the called party ever lifting the telephone receiver. Other systems forward an incoming call to a called party's pager including caller ID-type information. See, for example, U.S. Pat. No. 5,644,626 (Carlsen, et al.); U.S. Pat. No. 5,692,038 (Kraus, et al.) and U.S. Pat. No. 5,694,453 (Fuller, et al.). A drawback with such caller ID. type devices is that the calling party may block the identification of the calling number typically by entering a code using the keypad of a phone before a call is made.

It is thus desirable to provide a call tracing method and system that is simple to implement, significantly reduces the time for its implementation, and provides accurate information in less time than known call tracing methods and systems. It is also desirable to provide a call tracing method and system that can cancel an implemented call trace quickly. It is also desirable to provide an automated call tracing method and system that can be automatically implemented and canceled at a site remote from the switches of central offices thereby eliminating direct manual programming of the switches at the central offices. It is also desirable to provide a call tracing method and system that does not require any action by the called party.

BRIEF SUMMARY

According to a first aspect of the invention there is provided a method for tracing a call. The method includes the steps of:

(a) displaying a log-on screen on a display device, the log-on screen having a plurality of fields requiring input data including a telephone number field;

(b) inputting a telephone number in the telephone number field wherein the telephone number represents the number to be traced;

(c) establishing a call trace in a plurality of central offices;

(d) displaying a confirmation screen on the display device, the confirmation screen indicating whether the trace was successfully established or not in each of the plurality of central offices; and (e) indicating that a call has been made to the telephone number input in step (b).

According to a second aspect of the invention there is provided a method for tracing a call. The method includes the steps of:

(a) simultaneously designating at least one telephone number to be traced in a plurality of central offices;

(b) monitoring incoming calls at said plurality of central offices;

(c) determining when an incoming call at one of said plurality of central offices matches the at least one telephone number designated in step (a); and (d) if it is determined in step (c) that an incoming call at one of said plurality of central offices matches the at least one telephone number designated in step (a), then indicating that a match has occurred.

According to a third aspect of the invention there is provided a system for tracing calls. The system includes:

a processor;

a plurality of central offices coupled to the processor for sending messages to the processor and receiving messages from the processor;

wherein the processor is programmed to run the following call tracing routine;

receiving a message identifying a telephone number to be traced;

transmitting a command to the plurality of central offices to establish a trace on the identified telephone number;

transmitting a trace found message to a display device when any one of the plurality of central offices detects that the identified telephone number has been called.

According to a fourth aspect of the invention there is provided a call trace process performed by a computer network. The process includes the steps of:

a first party identifying a telephone number to be traced;

the first party sending a call trace activation message to the computer network authorizing the activation of a call trace, the message also including the telephone number to be traced;

the computer network sending a call trace activator message to a central office coupled to the computer network;

the central office sending a call trace found message to the computer network whenever an incoming call is matched to the telephone number to be traced;

the computer network sending a call trace information message to the first party wherein the call trace information message includes an identification of the telephone number of the incoming call.

BRIEF DESCRIPTION OF THE DRAWINGS

FIGS. 5–7 illustrate various screens that appears on a display device.

DETAILED DESCRIPTION OF THE PRESENTLY PREFERRED EMBODIMENTS

Figure 1:
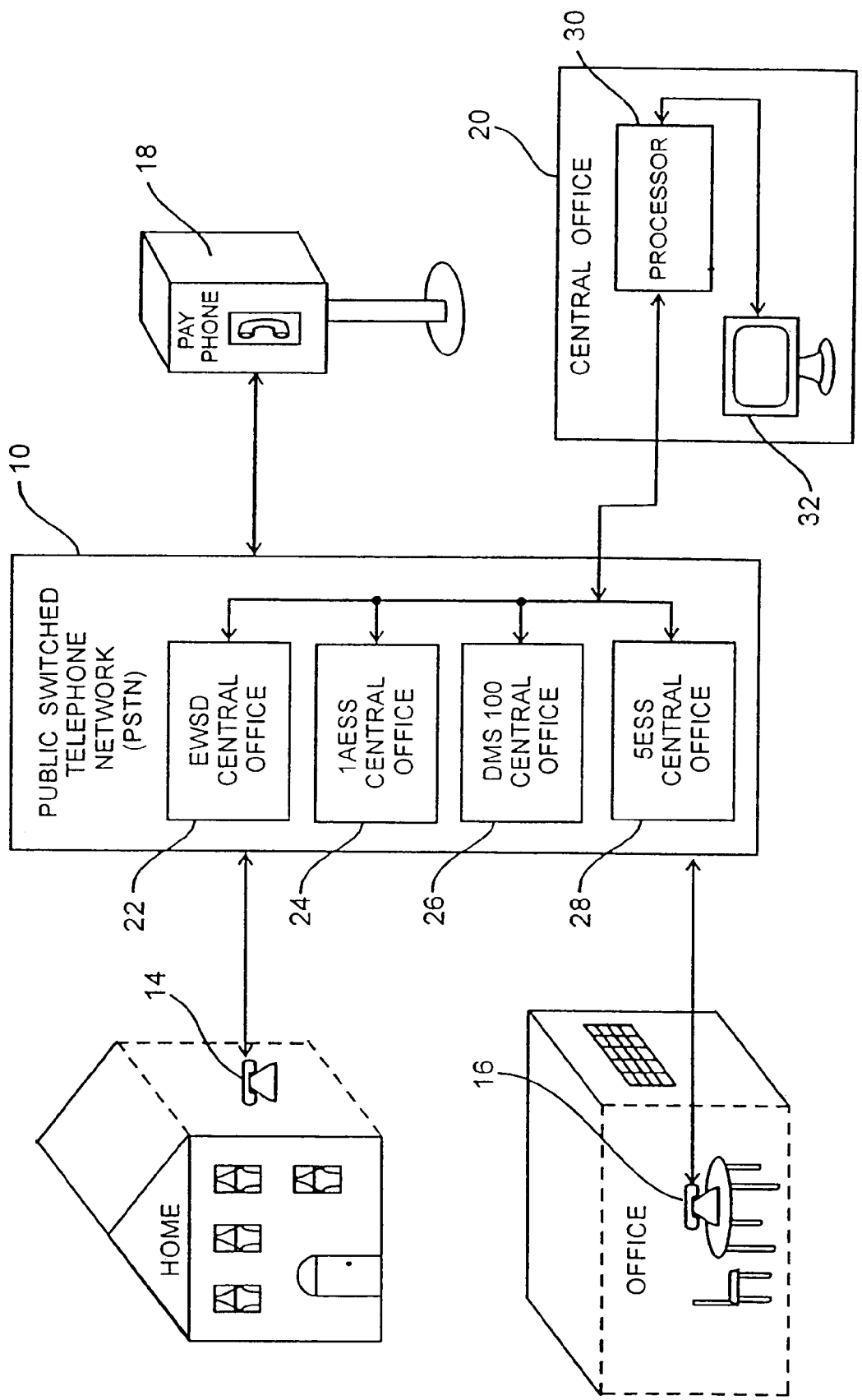
FIG. 1 is a block diagram illustrating the various interfacing equipment of a preferred embodiment of the call tracing method and system of the present invention.

FIG. 1 is a block diagram illustrating the various interfacing equipment of a preferred embodiment of the call tracing system and method of the present invention. The present invention is implemented in a preexisting telephone infrastructure. The infrastructure includes a public switched telephone network (PSTN) 10; and telephones 14, 16, 18 located at various geographic locations such as a home, office or payphone stand, respectively, coupled to the PSTN 10 so that they may communicate with one another as is well known in the art. The PSTN 10 includes central offices scattered at various geographic locations as well as other equipment which is well known to those of ordinary skill in the art. The central offices are categorized according to the telephone technology employed in the central offices. For example, central office 22 may be an EWSD type central office, central office 26 may be a DMS100 type central office and central office 28 may be a 5ESS type central office. Although one block is illustrated in FIG. 1 for each type of central office there of course would be a plurality of such offices scattered at various geographic location as is well known to those of ordinary skill in the art.

A control office 20 is also coupled to the PSTN 10. The control office 20 includes a processor 30 and a display unit 32 coupled thereto. As will be described in detail hereinafter, in this preferred embodiment it is in the control office 20 that a method for automated call tracing is implemented. The processor 30 sends messages to and receives messages from the central offices 22, 24, 26, 28 as will be described in detail hereinafter. In general, the processor 30 runs a call trace program which programs switches (not shown) in the central offices to monitor calls made to an identified number. Each central office returns a message to the processor 30 indicating whether the trace was successfully placed. When a call is made to the traced number, the central office which handles the call sends a message to the processor 30 indicating that a trace was made which includes preferably the number from which the call was placed and the central office which detected the call as well as the traced number.

Figure 2:
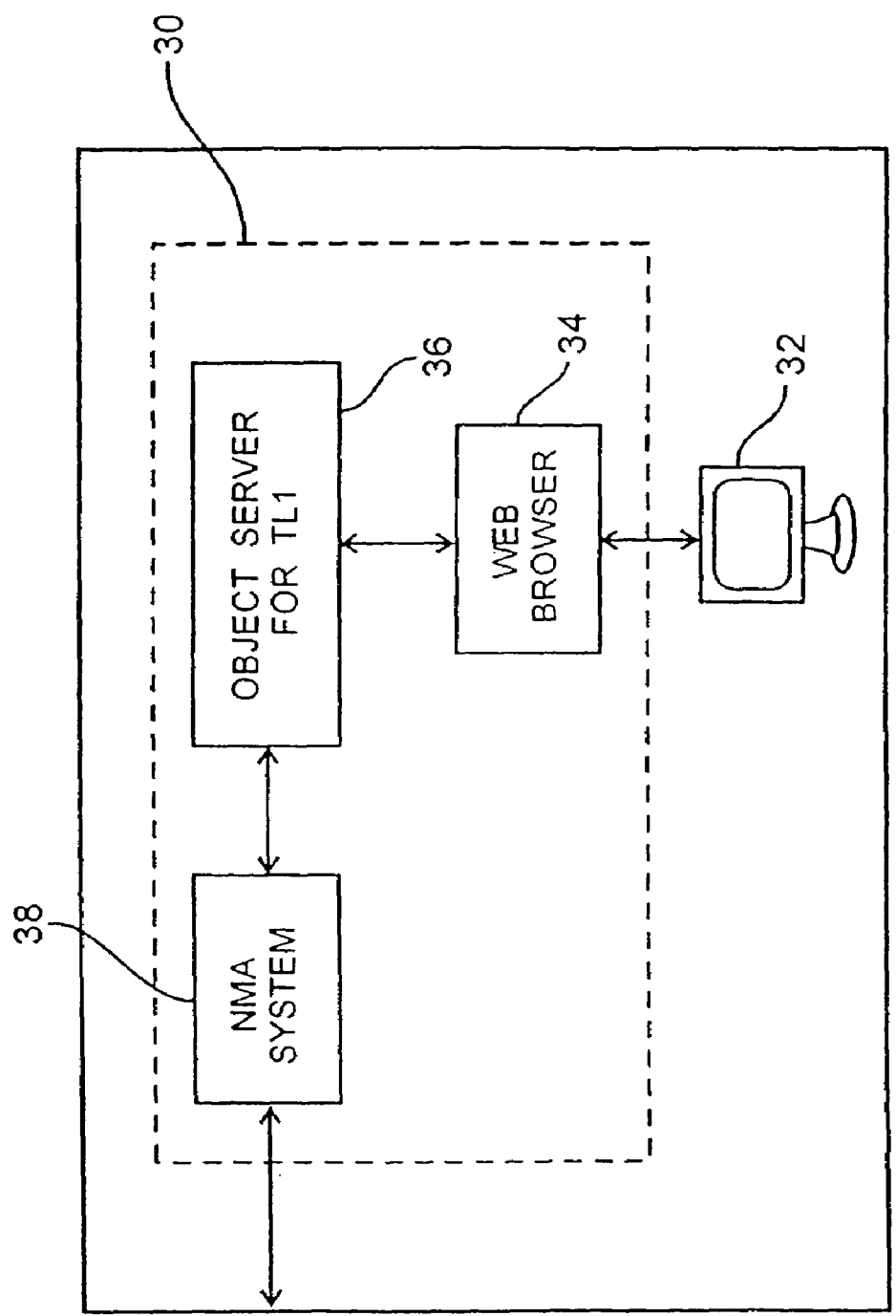
FIG. 2 is a detailed block diagram of the control office.

FIG. 2 is a detailed block diagram of the control office 20. In a preferred embodiment the processor 30 includes a Web browser 34, an object server 36 and a network monitoring and analysis system ("NMA system") 38. The Web browser 34 operates in an object-oriented language such as Pearl while the NMA system 38 operates in transactional language such as transactional language 1 (TL1) protocol. The object server 36 provides compatibility between the Web browser 34 and the NMA system 38 and preferably operates in an object-oriented language such as HTML or Pearl. In a preferred embodiment the processor 30 includes a Unix platform housing the Web browser 34 and object server 36 and a Stratus computer on which an application ("NMA application") implementing the NMA system is loaded. The NMA application is available from Bellcore of New Jersey.

Figure 3:
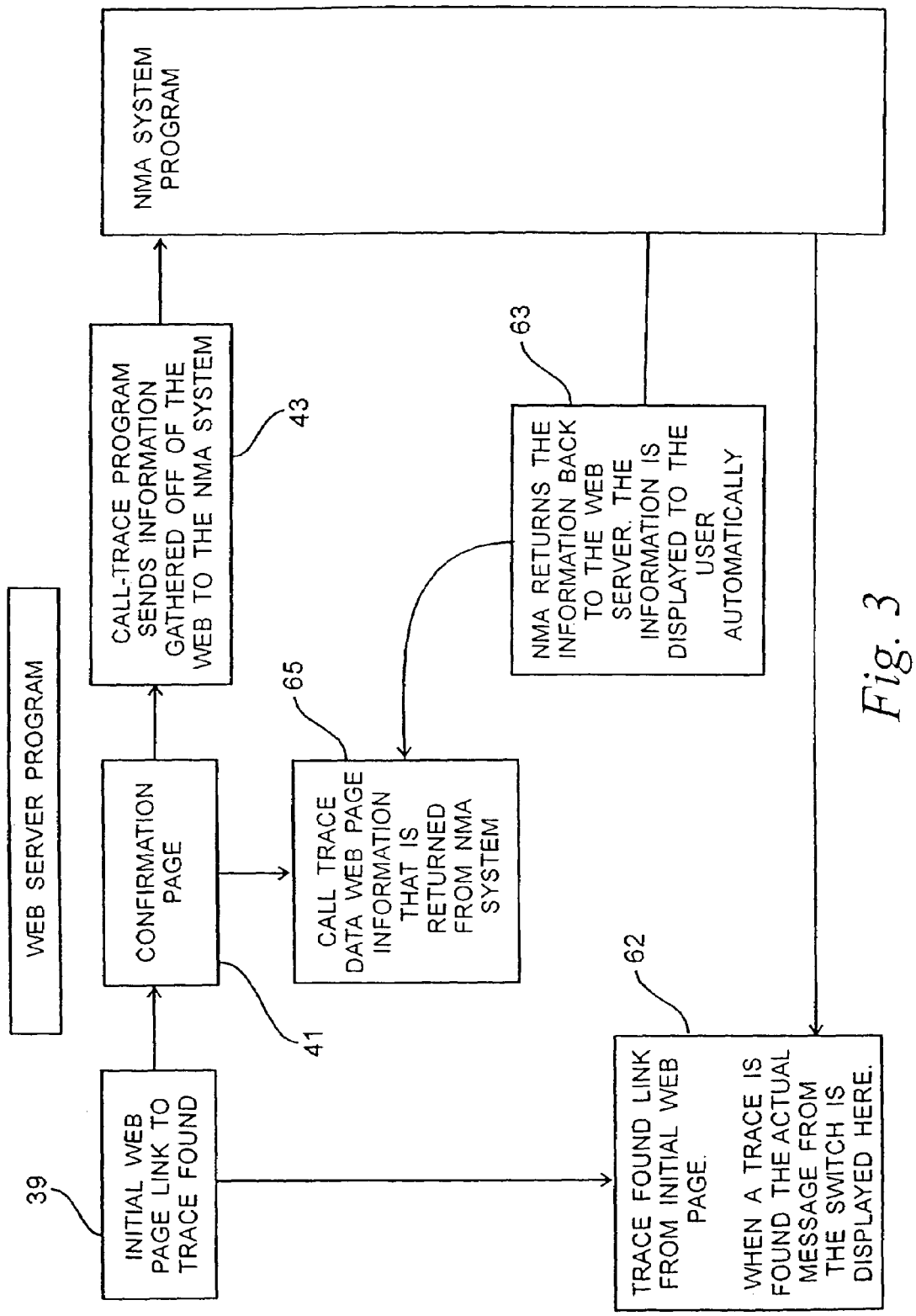
FIGS. 3 and 4 illustrate the command and message flow pattern between the control office and the public switched telephone network.
Figure 4:
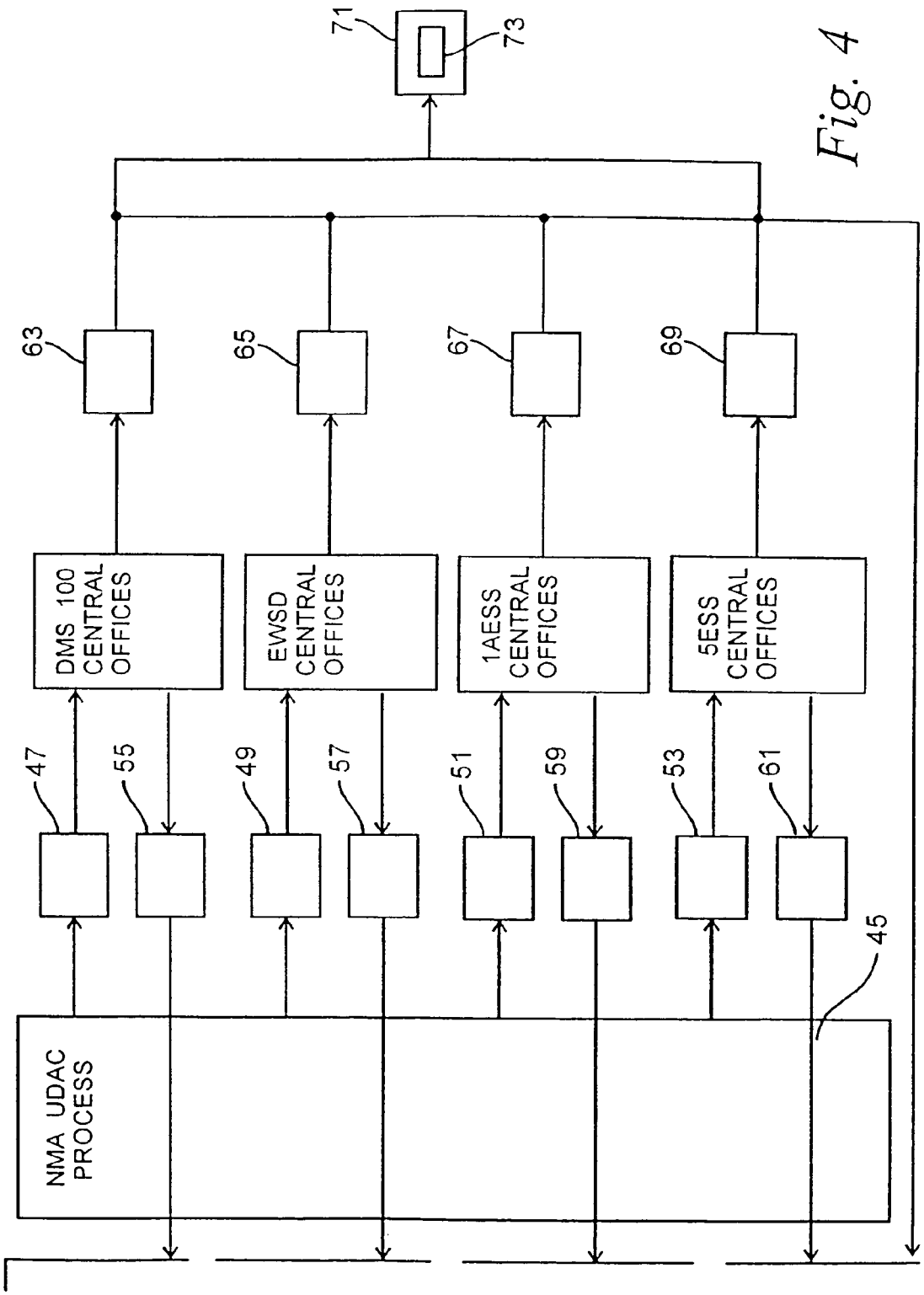
Figure 6:
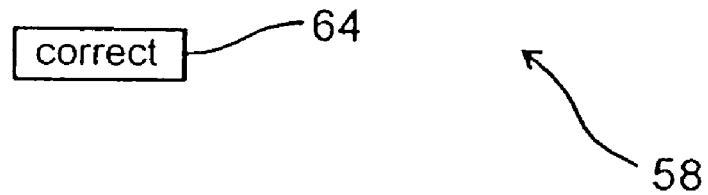

A call trace is preferably initiated through a Web browser page. FIGS. 3 and 4 illustrate the command and message flow pattern between the control office 20 and the PSTN 10. FIG. 3 represents the Unix platform side of the process which implements the Web browser and object server and FIG. 4 represents the Stratus computer side of the process which implements the NMA system. Beginning with FIG. 3 at block 39 an initial Web page is displayed on the display unit 32. FIG. 5 illustrates the initial Web page in the form of a log-on screen 40 that appears on the display device 32. The log-on screen 40 preferably includes a plurality of fields that either require input from the user or display output. For example, the input fields include a telephone number field 42 that requires the user to input the telephone number on which a trace is to be placed. In addition there is a geographic location field 44 which, in the preferred embodiment illustrated, indicates a choice of five states. Of course more or less states may be listed. In the geographic location field 44 the user selects which geographic area is to be monitored for incoming calls made to the traced phone number. For example, it may be desired to monitor calls made in Illinois to the traced number. The user may select one geographic area, a plurality of geographic areas or all of them depending on the desired scope of surveillance. A login field 46 and password field 48 may be provided. Once all of the required information is input by the user and the user is satisfied with the input values selected, the user clicks on a submit button 40 to begin the implementation of a call trace. A reset button 42 allows the user to clear the log-on screen and re-input data. Once the user submits the information on the log-on screen a new confirmation screen appears as indicated at block 41 of FIG. 3. FIG. 6 illustrates the confirmation screen 58. The confirmation screen 58 lists the number to be traced at line 60 and the geographic area where the trace will be placed at line 62. The user has the option at the confirmation screen 58 to either activate the call trace or cancel it. If the user clicks on the correct button 46, the call trace is activated.

Returning to FIG. 3, the NMA system is continuously running a program called file_checker which gathers information entered in the log on and confirmation screens and sends that information to the NMA system as indicated at block 43. Referring to FIG. 4 at block 45 the NMA system runs a call trace program. At block 45 separate messages are created for each type of central office. For example, a DMS100 Trace Process Trace message 47 is sent to every DMS100 central office in the geographic area selected. A EWSD Trace Process Trace message 49 is sent to every EWSD central office in the geographic area selected. A 1AESS Trace Process Trace message 51 is sent to every 1AESS control office in the geographic area selected. A 5ESS Trace Process Trace message 53 is sent to every 5ESS control office in the geographic area selected. Each of the central offices contacted returns a message 55, 57, 59 and 61 respectively to the Web server at block 63 indicating whether the trace was successful or not. The information is automatically displayed on the display unit at block 65. FIG. 7 illustrates a display screen of the returned information 100. It can be seen at lines 102 that a call trace was successfully implemented in a particular central office. At lines 104 it is indicated that a call trace was not successfully established. Different switch types may have different reasons for failing. For example, in the 1AESS central offices the 1A switch types must enter the number twice due to a problem in determining if the number is local or long distance. The number in the 1A case must be preceded with a 0 or 2 depending if it is local or long distance. The program according to a preferred embodiment of the present invention returns the results of both attempts. In the case of 5ESS central offices and the 5E switches the program needs to determine if the NPA of the 5ESS central office is the same as the NPA of the trace number and if a 7 digit number is entered into the switch. The DMS100 central office and DMS switches require a login and password and may fail this step in the process.

With the trace now in place, the central offices monitor for incoming calls made to the number placed on trace. Messages are automatically collected at the central offices, and when the traced number is called, an output message 63, 65, 67 or 69 depending on which central office detected the incoming call is passed to a trace found program. The trace found program reformats the message and sends the information to a Sfax program which generates an alphanumeric page to a security pager 71 in the following format:

"Trace found ### ### #### number called ### ### #### from XXXXXXXXXX central office."

The pager 71 displays the message on a display screen 73 of the pager 71. The message 63, 65, 67 or 69 generated by the central office is also sent back to the Web server at block 62. The initial logon screen 40 is displayed on the display unit 32 once the call trace is activated. At line 54 it is indicated how many incoming calls have been linked to the traced number. The user clicks on line 56 to display the actual message generated by a central office. This process is repeated every time the traced number is called and a file containing the trace information is augmented with the additional messages regarding calls made to the traced number. It was found through testing that it took approximately 1 minute to complete the page from the time the traced phone began to ring. This time will vary and depends mostly on the paging company used. It was found that it takes about 5 minutes to successfully implement a trace, i.e., program the central offices. If the particularities of some of the central offices were eliminated, such as the need for entering a number twice for 1AESS switches the time to implement a trace could possibly be shortened to about 1.5 minutes.

In a preferred embodiment all the calls to the traced number are also logged with time stamps as well as sent downstream to a MACS system and may be obtained through normal tracing channels.

To cancel a call trace the user simply enters the number on which the trace was placed in line 42 of screen 40 with a "can" prefix attached to the traced number. A confirmation page similar to that shown in FIG. 6 is again returned from the central offices and displayed indicating whether the trace was successfully canceled or not.

Figure 8:
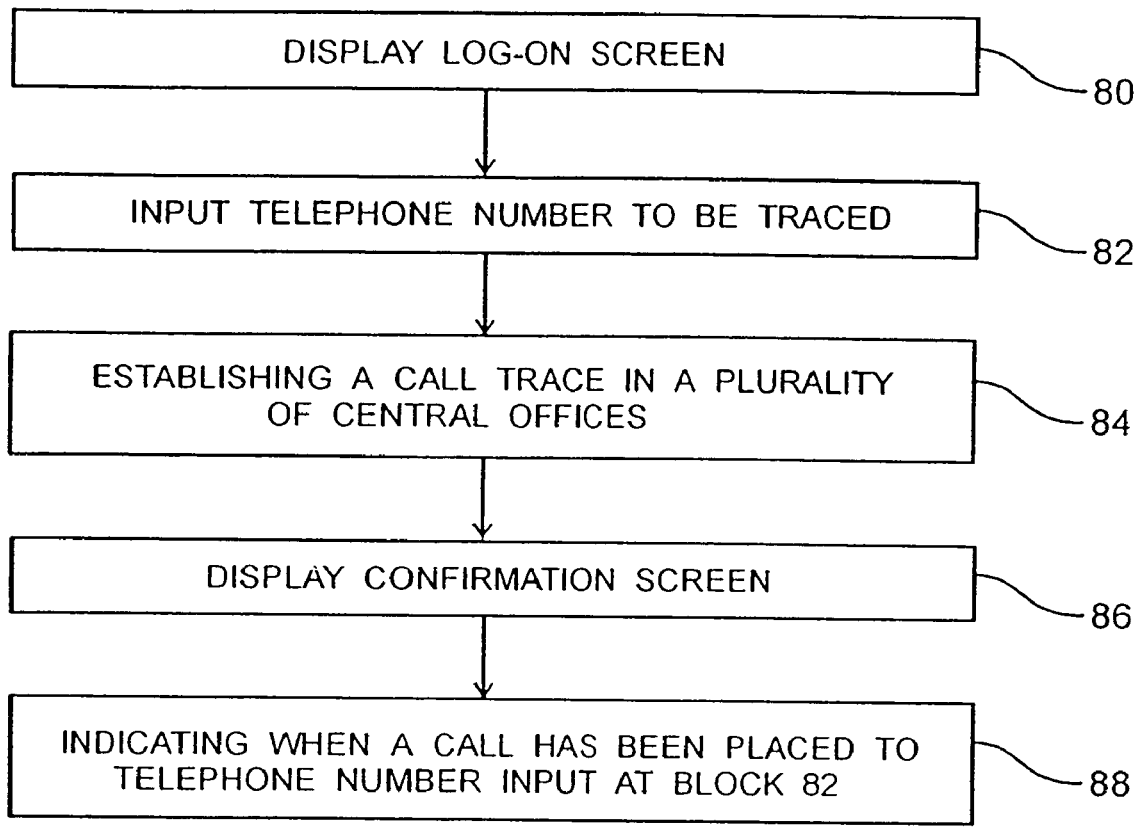
FIGS. 8 and 9 are flow charts of the call trace program according to preferred embodiments of the present invention.
Figure 9:
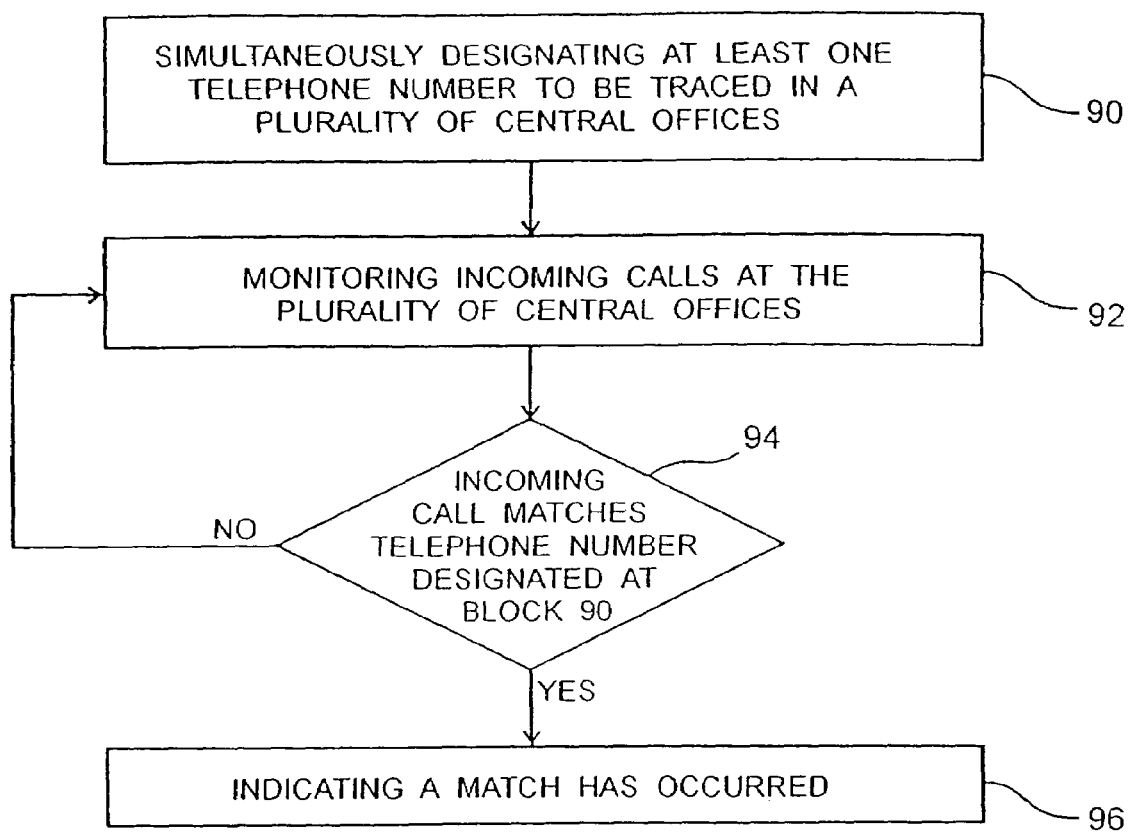

FIGS. 8 and 9 are flow charts of the call trace program according to preferred embodiments of the present invention.

It is to be understood that the forms of the invention described herein are to be taken as preferred examples and that various changes in the shape, size and arrangement of parts may be resorted to without departing from the spirit of the invention or scope of the claims.

It is therefore intended that the foregoing detailed description be regarded as illustrative rather than limiting, and that it be understood that it is the following claims, including all equivalents, that are intended to define the spirit and scope of this invention.

The invention claimed is:

1. A method for initiating a call trace in a telecommunications network, the method comprising:
   communicating with central offices of the telecommunications network using a network monitoring and analysis (NMA) system; and
   displaying in a web browser program on a display unit an initial web page arranged to collect data to establish the call trace in cooperation with the NMA system.

2. The method of claim 1 further comprising displaying a log on data entry screen on the initial web page.

3. The method of claim 2 further comprising:
   collecting information entered at the log on data entry screen using the NMA system; and
   sending messages to central offices of the telecommunications system based on the collected information.

4. The method of claim 3 further comprising sending the messages according to category of each central office, the central offices being categorized according to telephone technology employed in the central offices.

5. The method of claim 4 further comprising:
   identifying an office type for each central office; and
   formatting the messages in accordance with each respective office type.

6. The method of claim 5 wherein collecting information comprises:
   collecting a telephone number on which a trace is to be placed.

7. The method of claim 5 wherein collecting information comprises:
   collecting geographic information defining a geographic area to be monitored.

8. The method of claim 7 wherein collecting information comprises:
   collecting one geographic area selected by a user from a plurality of geographic areas offered to the user in the web browser program.

9. The method of claim 5 wherein collecting information comprises:
   collecting login information and password information.

* * * * *